Jan. 19, 1971   H. OVERHOFF ET AL   3,555,629
NO-HOLE FASTENING DEVICE
Filed Aug. 22, 1968   2 Sheets-Sheet 1

INVENTORS
HEINRICH OVERHOFF
DIETER JÜNEMANN
BY
Gordon Needleman
ATTORNEY

United States Patent Office 3,555,629
Patented Jan. 19, 1971

3,555,629
NO-HOLE FASTENING DEVICE
Heinrich Overhoff and Dieter Jünemann, Lorrach, Baden, Germany, assignors to A. Raymond, Baden, Germany, a firm
Filed Aug. 22, 1968, Ser. No. 754,630
Claims priority, application Germany, Aug. 31, 1967, R 35,828; Oct. 6, 1967, R 36,070
Int. Cl. A44b 17/00
U.S. Cl. 24—224     2 Claims

ABSTRACT OF THE DISCLOSURE

This is a fastening device for a trim member engageable with a headed stud which is fastened to a support. The fastener includes a keyhole slot which provides two flexible legs which are spaced for part of their length from the walls of a recess. The keyhole slot has an engagement portion and a lead-in portion connected by a narrow neck, the engagement portion being defined by a circumference greater than 300°.

BACKGROUND OF THE INVENTION

Fasteners for holding trim to a support are well known in the art as is the specialized type wherein an opening in the slot is provided in a central portion of the fastener to receive and hold a headed stud which is welded or otherwise attached to a support. The slot is substantially in the form of a "keyhole" slot.

This form of slot is not completely satisfactory because the engagement around the stud shank is not great enough. In other words, the shank is not circumscribed far enough so that the resulting clamping force is sufficient to anchor the fastener safely and permanently.

Another type of trim fastener utilizes spring tongues which are spaced from each other and which are arranged laterally inside the aperture in the central portion of the fastening device while the seat for holding and supporting the head of the stud is arranged behind the spring tongues. This design representing an open spring clasp comprises two units; namely, the two spring tongues and the seat for holding the head of the stud arranged separately. As in the previously mentioned design, the shank of the stud is not circumscribed completely enough to produce the necessary safe and permanent clamping force.

SUMMARY OF THE INVENTION

This invention is directed at a trim fastener for fastening trim to a headed stud which in turn is secured to a support, usually the body wall of a motor vehicle. The fastener comprises a plate part in the central portion of which is arranged the fastening means; for example, an opening and a slot for holding and supporting the stud as well as a guide nose on only one end side of the central portion to align the fastener during the attachment of the trim along the support.

An object of the present invention is to provide a trim fastener with which a permanent and safe connection between a headed stud and the fastener can be established in a very simple and quick manner.

The holding of the fastener to the stud shank as well as the seating and support of the head of the stud is effected by a spring fastening means whose configuration defines a closed area of one-piece construction. As implied heretofore, the spring fastener means is arranged in the central portion of the fastener.

With this arrangement the stud shank as well as the stud head is engaged sufficiently by the spring clamp and its resilient clasp head respectively so that the looping angle around the stud shank produces the necessary clamping force to anchor the fastener to the shank of the stud. This fastener also provides retaining for the shoulders head of the stud thereby avoiding the possibility of loosening and ensuring that the trim will be securely fixed to the support.

DESCRIPTION OF THE PREFERRED EMBODIMENTS

Figure 1:
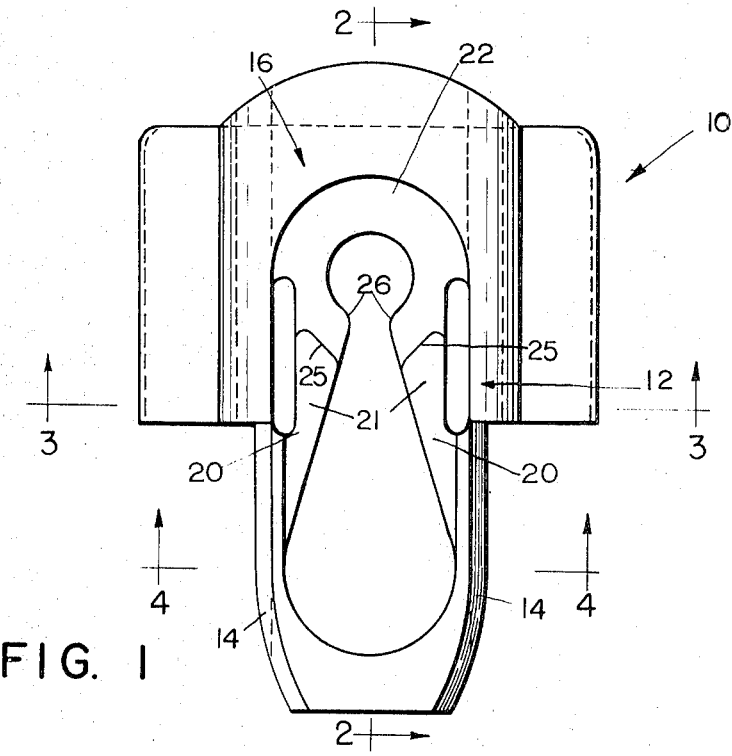
FIG. 1 is a top plan view of the fastening device shown on an enlarged scale.
Figure 2:
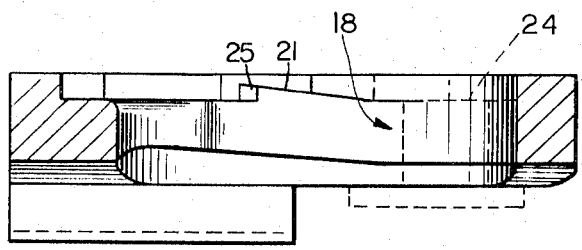
FIG. 2 is a section taken on line 2—2 of FIG. 1.
Figure 3:
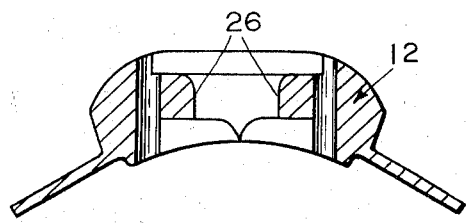
FIG. 3 is a section taken on line 3—3 of FIG. 1.
Figure 4:
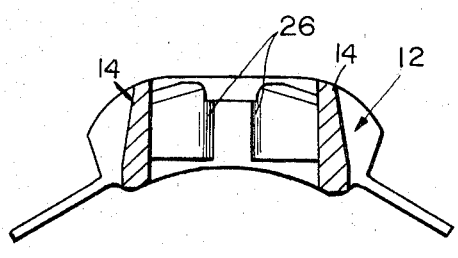
FIG. 4 is a section taken on line 4—4 of FIG. 1.

The fastener 10 comprises a plate part or body portion 12 having a forward guide portion 14 arranged at only one end of the plate part 12. In the central portion 16 of the plate part 12 an engagement portion for a headed stud 18 (shown in phantom) is provided. The engagement portion comprises a closed spring clamp which is formed of two resilient, flexible spring legs 20 protruding laterally within the central portion 16 of the fastener 10. The spring legs 20 are so designed that they evenly abut on their inner edges the shank of the headed stud 18 and also form the seat 22 for support of the head 24 of the stud 18. The upper surfaces of the spring legs 20 are upwardly inclined at 21 and the ends of the inclined portions proximate the seat 22 terminate in abrupt shoulders 25 which are disposed generally perpendicular to the surface of the seat 22 and face toward the seat and which are adapted to retain the head 24 of the stud 18 on the seat 22. At the seat 22 the two spring legs 20 are brought so close together that a neck or constriction 26 is formed. This provides an almost complete engagement around the shank of the stud 18. The neck 26 has a width slightly less than the shank of the stud 18 causing it to resiliently flex the spring legs 20 on engagement. After the stud 18 is engaged in the seat 22 the spring legs 20 will attempt to return to their original rest position thereby closely engaging the stud 18 in a pinch fit. The seat 22 is also flexible enough to provide takeup where melting loss occurs due to welding of the stud 18 to a support. Note that the fastener is mounted to the stud over a plane surface.

Unfortunately the very resilient action of the spring legs 20 frequently does not provide a sufficiently high clamping force for certain holding purposes. This inconvenience can be eliminated by providing a fastener 10a to be disclosed hereinafter where the flexing of the spring legs is inhibited by a lateral articulation over a thin membrane on the body portion 12a.

Figure 5:
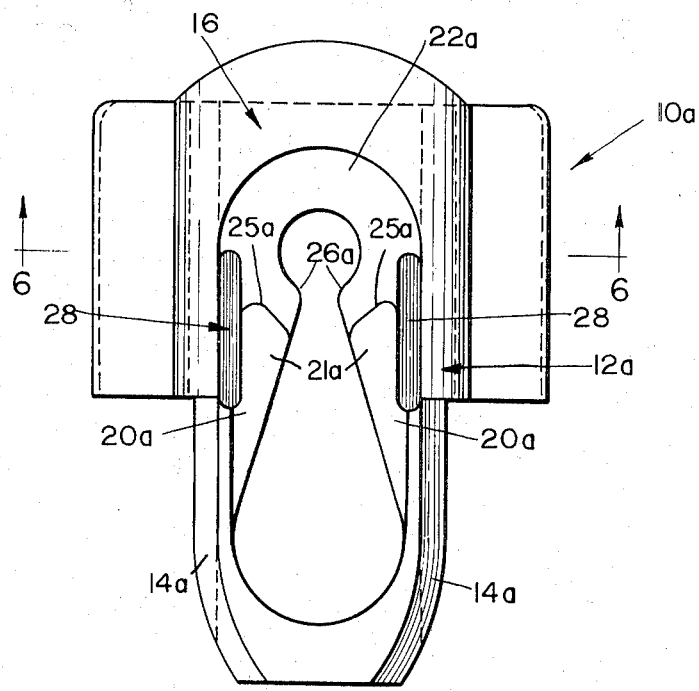
FIG. 5 is a top plan view of a variation of the fastener shown in FIG. 1.
Figure 6:
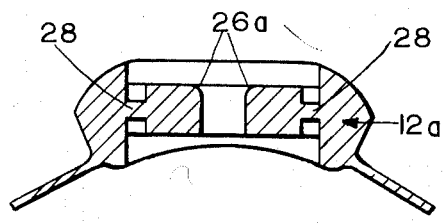
FIG. 6 is a section taken on line 6—6 of FIG. 5.

The fastener 10a comprises a body portion 12a and a guide portion 14a arranged at one end of the body portion 12a. As shown in the drawing at FIG. 5 the fastener 10a is the same as the fastener 10 except that a thin, membrane 28 is located laterally between each of the spring legs 20a and the adjacent section of the body portion 12a. The membrane 28 can be located at any level between the legs 20a and the body portion 12a.

What is claimed is:
1. A fastening device for securing a trim member or the like to a support comprising a body portion having an internal wall defining a recess, and a pair of resilient legs extending inwardly from the internal wall and joined to the said internal wall at both ends thereof and having internal edges defining an aperture having a portion for receiving a headed stud member projecting from the sup- port, and a portion for receiving and retaining the shank of the headed stud member, portions of the resilient legs having opposed converging edges defining a tapered section in the aperture leading from said stud member receiving portion into the stud shank receiving and retaining portion, said tapered portion of said aperture communicating with said stud shank receiving and retaining portion through a narrow neck, the upper surfaces of the resilient legs defining the tapered portion of the aperture being inclined upwardly and the portions of said resilient legs adjacent the stud shank retaining portion of said aperture defining a seat for the stud head, the said inclined portions of the legs terminating in a pair of abrupt shoulders disposed generally perpendicular to and facing toward the portions of said legs defining said stud head seat, each of said resilient legs having a section adjacent the said shoulders which is spaced from the said internal wall of the body portion of the fastening device.

2. A fastening device according to claim 1 wherein a portion of each of the resilient legs is joined to the said internal wall of the body portion adjacent the said shoulders by a thin membrane.

References Cited

UNITED STATES PATENTS

| | | | |
|---|---|---|---|
| 293,041 | 2/1884 | Laflin | 24—224 |
| 1,308,140 | 7/1919 | Backmyer | 24—224 |
| 1,495,118 | 5/1924 | Stark | 24—224 |
| 2,041,606 | 5/1936 | Hofmann | 24—224 |
| 2,246,852 | 6/1941 | Kale | 24—224 |
| 2,544,995 | 3/1951 | Kajdan | 24—211 |
| 3,271,059 | 9/1966 | Pearson | 24—224X |

STEPHEN J. NOVOSAD, Primary Examiner

UNITED STATES PATENT OFFICE
CERTIFICATE OF CORRECTION

Patent No. 3,555,629  Dated January 19, 1971

Inventor(s) Heinrich Overhoff et al.

It is certified that error appears in the above-identified patent and that said Letters Patent are hereby corrected as shown below:

The title should read --TRIM FASTENING DEVICE--.

Signed and sealed this 9th day of November 1971.

(SEAL)
Attest:

EDWARD M. FLETCHER, JR.
Attesting Officer

ROBERT GOTTSCHALK
Acting Commissioner of Patent